United States Patent [19]
Lopez Alba

[11] Patent Number: 5,806,663
[45] Date of Patent: Sep. 15, 1998

[54] TRANSPORT DEVICE

[76] Inventor: Adelardo Lopez Alba, Poligono Industrial Sur, 08754 El Papiol (Barcelona), Spain

[21] Appl. No.: 639,303

[22] Filed: Apr. 25, 1996

[30] Foreign Application Priority Data

Apr. 26, 1995 [ES] Spain ..................................... 9501126

[51] Int. Cl.$^6$ .................................................. B65G 15/10
[52] U.S. Cl. ........................................... 198/817; 198/831
[58] Field of Search ...................................... 198/817, 831

[56] References Cited

U.S. PATENT DOCUMENTS

| | | | |
|---|---|---|---|
| 1,535,785 | 4/1925 | Luce | 198/817 |
| 3,367,474 | 2/1968 | Kerr et al. | 198/831 |
| 3,509,984 | 5/1970 | Hartung et al. | 198/831 |

FOREIGN PATENT DOCUMENTS

| | | | |
|---|---|---|---|
| 870271 | 10/1981 | Russian Federation | 198/817 |
| 1089010 | 4/1984 | Russian Federation | 198/817 |
| 1165619 | 7/1985 | Russian Federation | 198/817 |

*Primary Examiner*—Joseph E. Valenza
*Attorney, Agent, or Firm*—IP Group of Pillsbury Madison & Sutro LLP

[57] ABSTRACT

A dual strand-type transport device of the type which includes sections of chain for loads supported on wheels at at least four points wherein, for each strand, there is provided a section forming a closed circuit of chain which is accommodated inside a longitudinal cavity defined by a rail of quadrangular section, having two tracks which are strictly parallel over the whole of their route, a propellent mechanism constituted by an electric motor with speed-regulating and safety elements, and a transmission element which connects the two tracks, thus ensuring that the two strands maintain a constant radial speed.

3 Claims, 3 Drawing Sheets

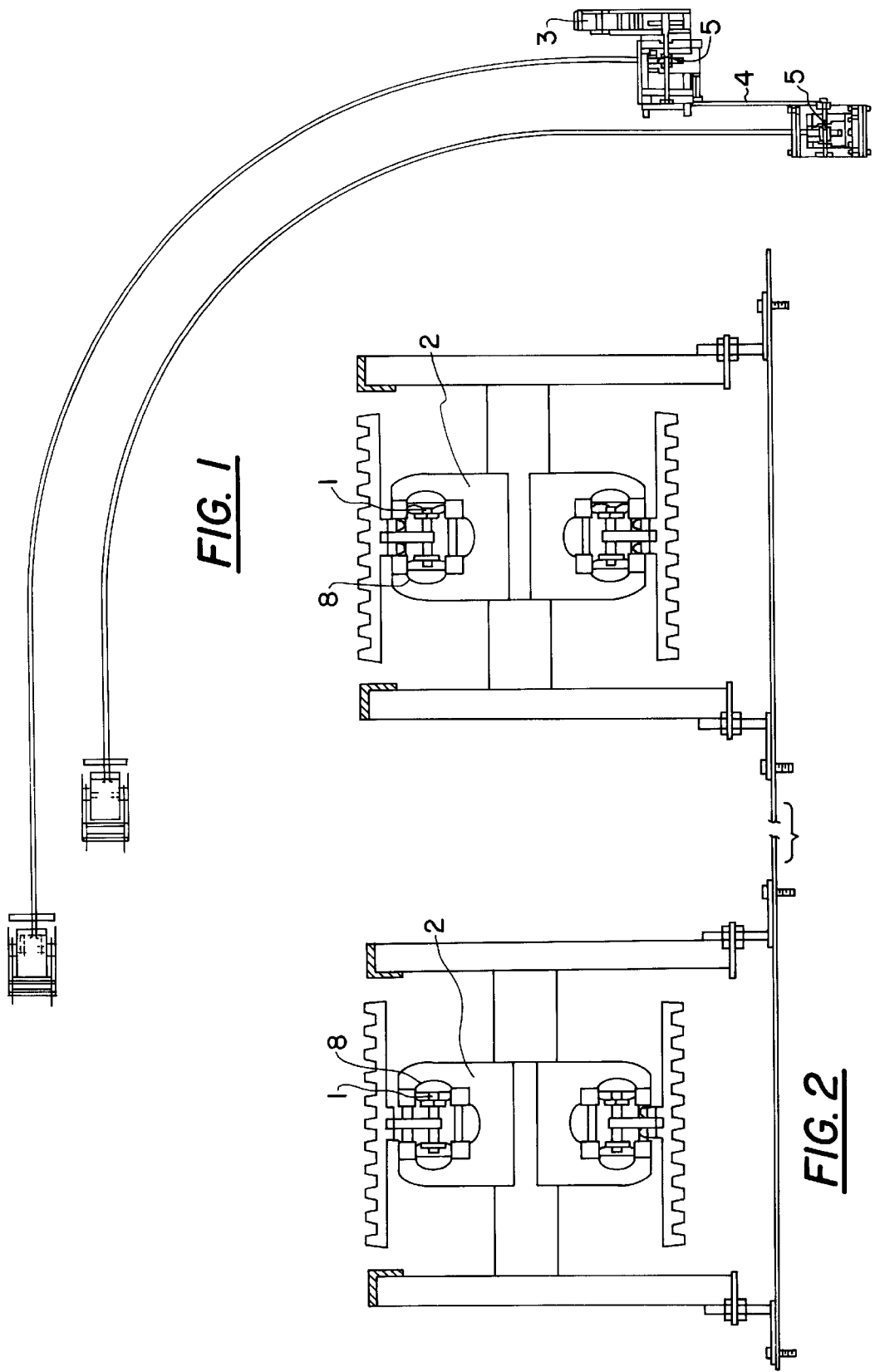

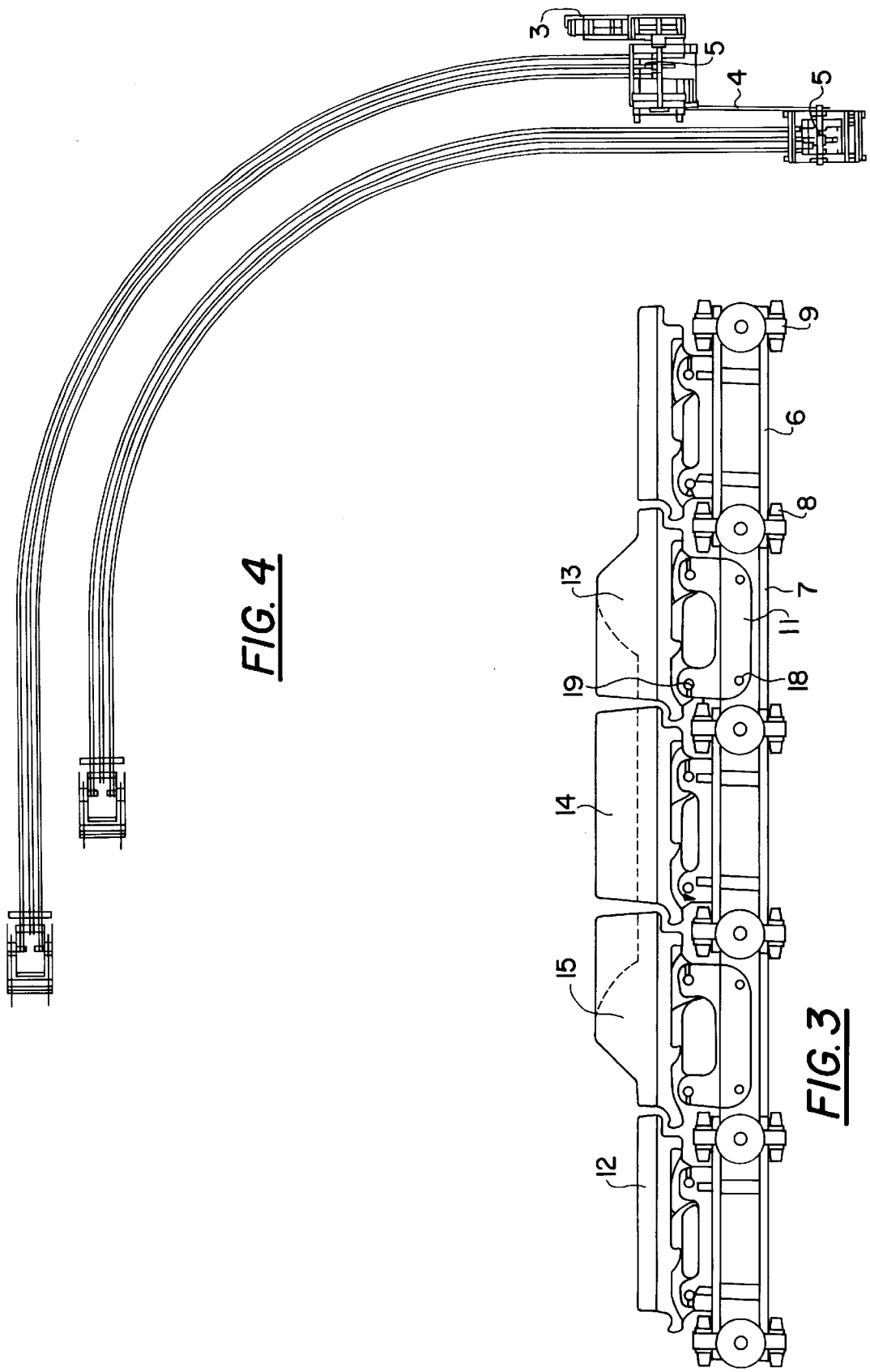

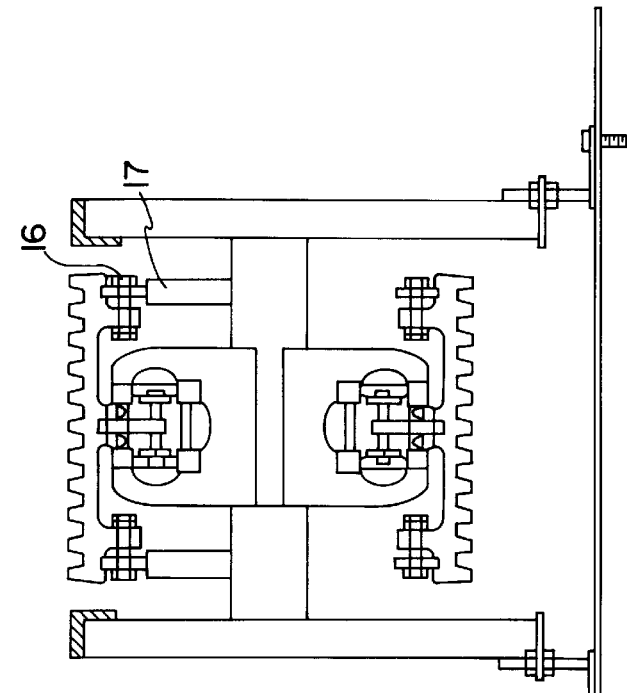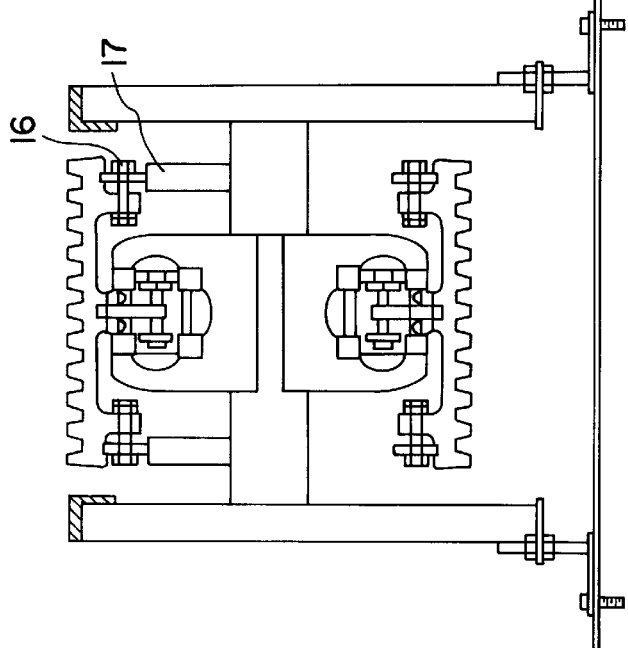
FIG. 5

TRANSPORT DEVICE

BACKGROUND OF THE INVENTION

The present invention relates to a transport device, and in particular to a dual strand-type transport device equipped with chains for transmitting forces and intended for moving loads supported on wheels at at least four points, the strands of chain being driven by an electric motor.

The transport device described hereinafter is intended to form part of installations for supported loads, such as those used in industrial establishments for the manufacture of vehicles, machinery or other elements, the shifting of which will require the use of wheels on which the assembly is supported.

Various types of devices for internal transport are known, in which chains similar to those proposed here are used, as also are support plates for the loads and an electric motor with speed regulation for shifting the loads, but such devices are generally only capable of carrying out linear movements.

SUMMARY OF THE INVENTION

The transport device of the present invention, because of its design characteristics, the present invention permits the carrying out of linear and curvilinear movements, with a full range of radii of curvature, in both directions, and also changes in height, thus making it possible, with a single traction motor and by means of a system of transmission between the strands, to main a constant radial speed between the latter.

According to the present invention, there is provided a dual strand-type transport device of the type which comprises sections of chain for loads supported on wheels at at least four points wherein, for each strand, there is provided a section forming a closed circuit of chain which is accommodated inside a longitudinal cavity defined by a rail of quadrangular section, having two tracks which are strictly parallel over the whole of their route, a propellent mechanism constituted by an electric motor with speed-regulating and safety elements, and a transmission element which connects the two tracks, thus ensuring that the two strands maintain a constant radial speed.

The new transport device can be installed on the ground, below ground or in an elevated manner with a view to receiving loads for shifting them to ground level or to a lower or higher level, as the case may be, and can form two planes, namely an inclined and a horizontal one. The loads are used exclusively in one direction, which is regarded as the outward direction. For the return journey of the sections of chain, use may be made of the working path, in the lower part thereof, or else of a different path since, in view of the fact that the configuration of the device permits complete freedom of movement in accordance with cardan-type articulations, the return journey may adopt the position of the chord of a curve.

BRIEF DESCRIPTION OF THE DRAWINGS

For a better understanding of the present invention, and to show how it may be carried into effect, reference shall now be made, by way of example, to the accompanying drawings, in which:

FIG. 1 is a plan view of the new transporter device in its version for light loads;

FIG. 2 is a sectional view in elevation, on a larger scale, of the transport device proper;

FIG. 3 represents, in side view, a section of the new device with its functional components;

FIG. 4 is a plan view, corresponding to that in FIG. 1, of the device in its version for heavy loads; and FIG. 5 is a sectional view, corresponding to that in FIG. 2, of the device in FIG. 4.

DETAILED DESCRIPTION

The elements designated by numbers in the drawings correspond to the parts indicated below.

The device forming the subject of this application comprises a circuit having dual running based on sections of chain (1) which pass along inside the longitudinal space defined by individual rails (2), the cross-section of which is seen in FIGS. 2 and 5. The device is driven by means of the electric motor (3), which is provided with the appropriate reducing, regulating and safety mechanisms.

The transmission element (4) which connects the two strands ensures that the latter maintain a constant radial speed, thus preventing the loads from being able to adopt unregulatable positions.

The transporter installation to which the device being described belongs has a set route in the form of curves and straight sections over horizontal and vertical planes, the two tracks being parallel with one another at any given moment. The wheel (5) effects the entrainment or sending-back of the chain (1), in the propulsion mechanism based on the motor (3) and the corresponding complementary transmission elements, including the aforesaid element (4).

The chain incorporated in the device is formed by linear links (6) and (7), with which there are associated bearings (8) for guiding and supporting the chain on the inside of the rail (2) and for entraining it on the wheels (5). The links are joined to one another in a horizontal and vertical manner by means of the crosspiece (9), the latter permitting cardan-type articulation in such a way that the chain is able to adopt any positional configuration in the guide rail (2).

The supports (11) connect the chain (1) to the cover plates (12) and to the anti-acceleration or entrainment plates (13) and (15), according to the direction of running, which may be reversible. An elevation (14) constitutes a lateral guide.

Each of the supports (11) joins the chain (1) to the plates (12) to (15) by means of screws or bolts (18) which keep the support applied to the chain with the cooperation of an element (19) which links the aforesaid plates (12) to (15) together while allowing them a set amount of play, so that the said plates are articulated according to the needs of the circuit which are imposed by its horizontal or vertical shape, as a result of which the plates do not constitute rigid elements but, on the contrary, ones which are extremely adaptable to the configuration of the circuit and also to that of the loads to be transported.

For heavy loads, for example the moving of vehicles in factories and on assembly lines, the internal transport of large parts and sub-assemblies of machinery and engines, etc., use is made of the reinforced device in FIGS. 4 and 5, in which the supporting plates have a number of rollers (16) providing support on the guides (17), as a result of which the chain is exempted from receiving the force due to the weight of the loads transported, as was the case in FIGS. 1 to 3. In the present version, the chain exclusively performs the function of guiding and articulating the assembly, and also of ensuring the entrainment of the plates, without directly receiving the weight which bears down on the latter.

I claim:

1. A dual strand-type transport device, comprising:
   sections of chain for loads supported on wheels at at least four points wherein, for each of two strands, there is provided a section forming a respective closed circuit of chain which is accommodated inside a respective longitudinal cavity defined by a respective guide rail of quadrangular section, each said guide rail having two tracks which are strictly parallel over the whole of their route;

a propellant mechanism constituted by an electric motor with speed-regulating and safety elements; and a transmission element which connects the two tracks, thus ensuring that the two strands maintain a constant radial speed;

auxiliary wheels;

each said strand of said chain comprising components including linear links provided with bearings for guiding and supporting the respective said strand of said chain on the inside of the respective said guide rail and entraining the respective said strand of said chain on said auxiliary wheels said links being joined in a horizontal and vertical manner by means of a crosspiece which permits cardan-type articulation of the components of the respective said strand of said chain, thus enabling each said strand of said chain to adopt any configuration of the respective said guide rail.

2. The dual strand-type transport device according to claim 1, further including:

carrier plates; and supports which connect the chain and the carrier plates comprising couplings provided by bolts which keep the supports between links applied to the chain, with the aid of an element joining said supports to said carrier plates, thus allowing a set amount of play for said carrier plates which imparts mobility to said carrier plates.

3. dual strand-type transport device according to claim 1, wherein:

said carrier plates have rollers providing support on lateral guides, thus exempting the chain from receiving forces due to loads.

* * * * *